United States Patent [19]

Karr-Ake

[11] Patent Number: 4,564,331
[45] Date of Patent: Jan. 14, 1986

[54] ROBOT

[76] Inventor: Wendell Karr-Ake, 1422 St. Clair River, Algonac, Mich. 48001

[21] Appl. No.: 458,479

[22] Filed: Jan. 17, 1983

[51] Int. Cl.$^4$ .............................................. B25J 9/00
[52] U.S. Cl. ...................................... 414/730; 414/4; 901/13; 901/17; 901/22; 200/47
[58] Field of Search ................ 414/730, 4; 901/11–13, 901/17, 22; 200/47

[56] References Cited

U.S. PATENT DOCUMENTS

| Re. 28,089 | 7/1974 | Devol | 901/11 X |
| 2,811,267 | 10/1957 | Bock | 901/12 X |

FOREIGN PATENT DOCUMENTS 877510 10/1981 U.S.S.R. ............................ 901/12 X

OTHER PUBLICATIONS

Rudisill et al., "Guide to Limit Switches", Product Engineering, Nov. 12, 1962, pp. 81–101.

*Primary Examiner*—Terrance L. Siemens
*Attorney, Agent, or Firm*—Gifford, VanOphem, Sheridan & Sprinkle

[57] ABSTRACT

A robot of the type having a housing and a manipulator mounted to the housing and movable along a plurality of predetermined axes of movement. A drive mechanism is associated with the each axis of movement for moving, upon actuation, the manipulator along its respective axis of movement. The actuation of the drive mechanisms is controlled by a program drum which is rotatably mounted to the housing. A plurality of cam segments are adjustably secured to the drum at both axially and circumferentially spaced positions thus forming a plurality of axially spaced, segmented cam rings. A plurality of cam followers are secured to the housing so that one cam follower registers with each cam ring. Each cam follower is connected with an actuator so that, when the cam follower engages a cam segment on the drum, the actuator activates the drive mechanism corresponding to the particular cam ring. Conversely, the actuator deactivates its associated drive mechanism when the cam follower disengages from the cam segment.

10 Claims, 8 Drawing Figures

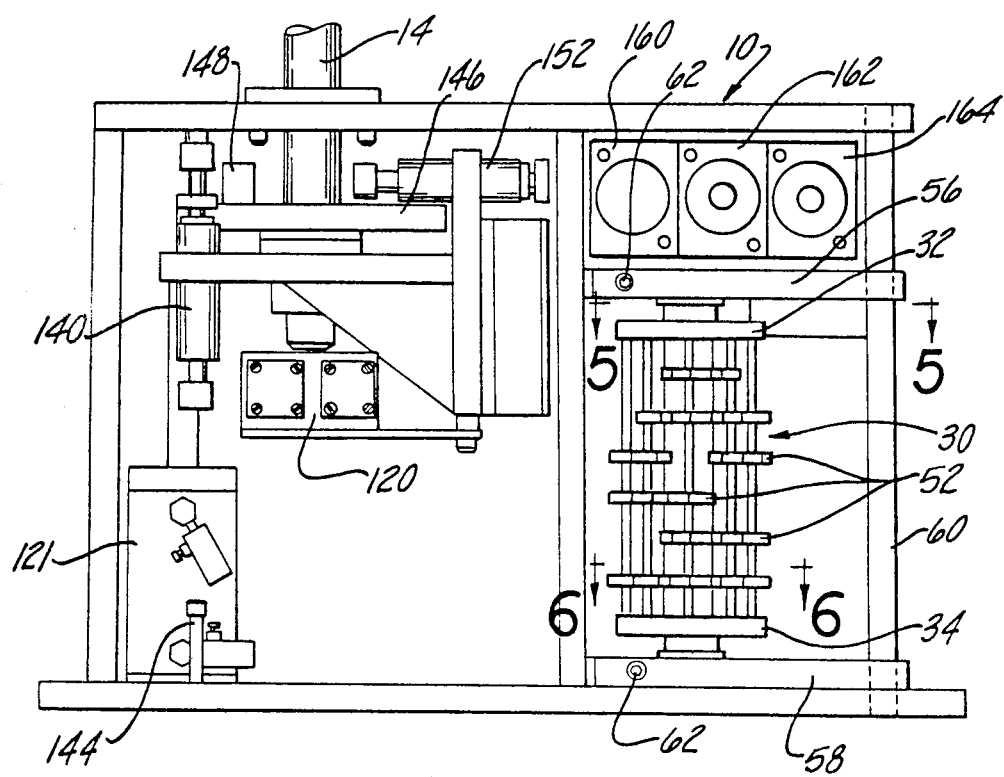
Fig-4
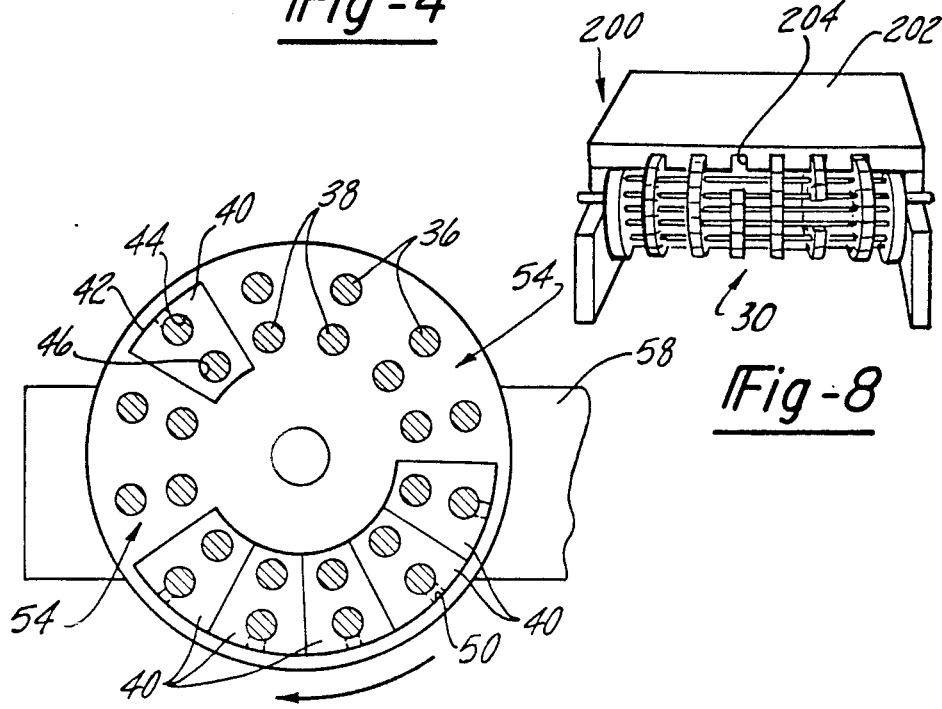
Fig-8
Fig-6

ROBOT

BACKGROUND OF THE INVENTION

I. Field of the Invention

The present invention relates generally to robots and, more particularly, to a robot with means for adjustably controlling the actuation of the robot.

II. Description of the Prior Art

There are a number of previously known robots which include a manipulator or robot arm which is movable along a number of predetermined axes of movement. Furthermore, a drive means is associated with each axis of movement so that actuation of a particular drive means moves the manipulator along its respective axis of movement. Conversely, deactuation of the drive means terminates the movement of the manipulator along that particular axis of movement.

In order to teach the robot to perform the desired task, it is necessary to program the sequential actuation and deactuation of the various drive means in order to obtain the desired overall movement of the manipulator. These previously known robot programming means, however, have been both complex and expensive in construction as well as difficult to utilize.

SUMMARY OF THE PRESENT INVENTION

The present invention overcomes the above-mentioned disadvantages of the previously known robots by providing a robot which utilizes a simple, inexpensive and yet totally effective programming means.

In brief, the robot of the present invention comprises a housing and a manipulator which is mounted to the housing and movable along a number of predetermined axes of movement. A drive means is associated with each axis of movement so that, upon actuation, the drive means moves the manipulator along its particular axis of movement. Conversely, upon deactuation of the drive means, the movement of the manipulator along that axis of movement terminates.

The novelty of the present invention, however, resides in the means for programming the sequential and/or simultaneous actuation of the various drive means to achieve the desired overall movement of the manipulator. This programming means comprises a drum which is rotatably mounted to the housing and a plurality of cam segments which are adjustably secured to the drum at both circumferentially and axially spaced positions therealong. Once positioned along the drum, the cam segments form a predetermined number of axially spaced, segmented cam rings.

A plurality of cam followers are secured to the housing at axially spaced positions and adjacent the drum so that each cam follower registers with one cam ring. Each cam follower is associated with and thus controls the actuation of one of the drive means. Thus, when the cam follower engages a cam segment on the drum, the drive means associated with that cam follower is actuated thus moving the manipulator along its particular axis of movement. Conversely, when the cam follower does not engage a cam segment on the cam ring, i.e., when the cam follower registers with an open space between two cam segments, the cam follower deactuates its associated drive means thus terminating the movement of the manipulator along the particular axis of movement associated with the cam follower.

In the preferred form of the invention, the cam segments are adjustably secured to the drum to provide ease of programming for the robot. Furthermore, the drum is preferably pivotally secured to the housing to facilitate programming the drum by providing convenient access to the drum.

BRIEF DESCRIPTION OF THE DRAWING

A better understanding of the present invention will be had upon reference to the following detailed description when read in conjunction with the accompanying drawing, wherein like references refer to like parts throughout the several views, and in which:

FIG. 4 is a side view of a preferred form of the invention and with parts removed for clarity;

FIG. 6 is a partial sectional view taken substantially along line 6—6 in FIG. 4 and enlarged for clarity;

FIG. 8 is a side view of a programming fixture.

DETAILED DESCRIPTION OF A PREFERRED EMBODIMENT OF THE PRESENT INVENTION

Figure 1:
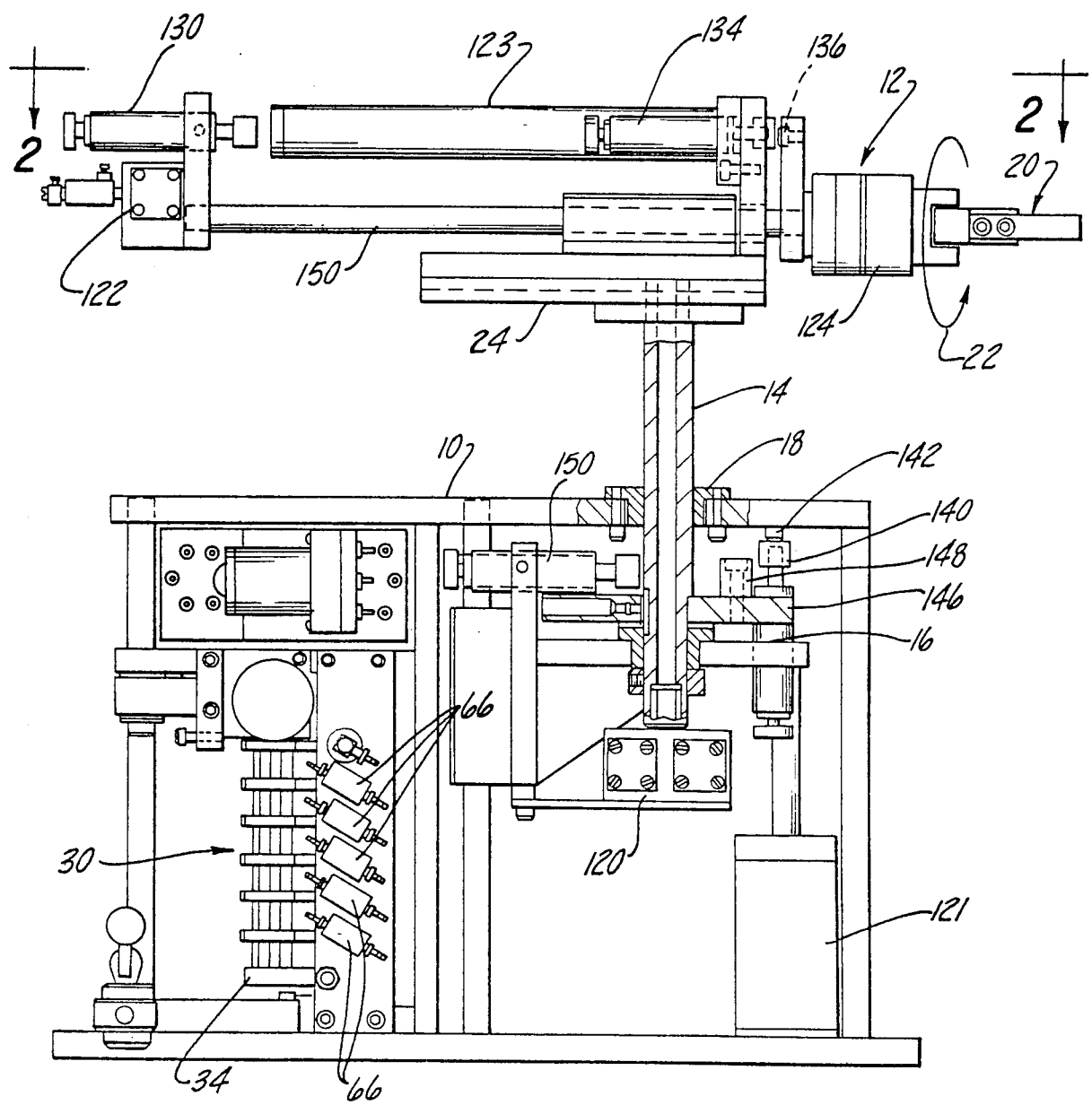
FIG. 1 is a side fragmentary sectional view illustrating a preferred form of the invention.
Figure 2:
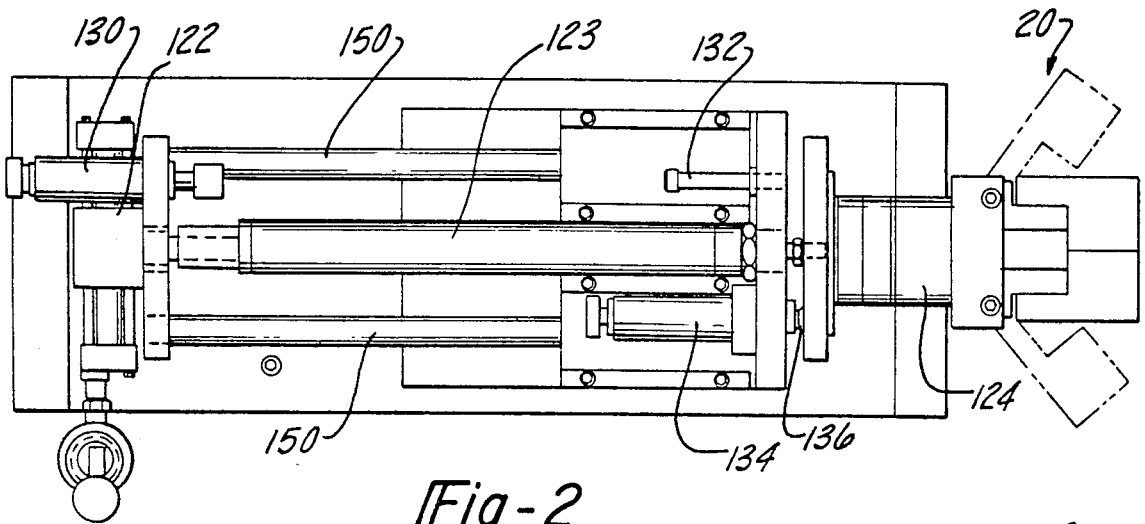
FIG. 2 is a top view taken substantially along line 2—2 in FIG. 1 and with parts removed for clarity.

With reference first to FIGS. 1 and 2, a preferred embodiment of the robot of the present invention is shown and comprises a housing 10. An elongated robot arm or manipulator 12 is longitudinally slidably mounted to a base 24 by guide rods 150. The base 24, in turn, is secured to the top of a shaft 14 and the shaft 14 is both rotatably and axially slidably mounted to the housing 10 by a thrust bearing 16 and bushing 18.

The manipulator 12 includes a jaw 20 movable between an open and a closed position as respectively shown in phantom and solid line in FIG. 2. The jaw 20 is also rotatable about its own axis as illustrated by arrow 22 (FIG. 1) as well as extendable and retractable with respect to its base 24.

The rotation, extension and retraction of the jaw 20 as well as the rotation and vertical movement of the shaft 14 each constitutes an axis of movement of the manipulator 12. Furthermore, for each axis of movement the robot includes a drive mechanism which, upon actuation, moves the manipulator 12 along its particular or associated axis of movement. Conversely, upon deactuation of the drive means, the movement of the manipulator 12 along that particular axis of movement terminates.

Any conventional means can be used to drive the manipulator 12 along its various axes of movement. As shown in the drawing, however, a pneumatically operated rotary drive mechanism 120 is used to rotatably drive the shaft 14 and thus rotate the manipulator 12 about a vertical axis with respect to the housing 10. A double acting pneumatic cylinder or drive means 121 vertically raises and lowers the shaft 14, and thus the manipulator 12, with respect to the housing 10.

Similarly, a pneumatically powered rotary drive means 122, upon actuation, rotates the jaw 20 about its axis as shown by arrow 22 (FIG. 2), while a double acting pneumatic cylinder or drive means 123, upon actuation, extends and retracts the manipulator 12 with respect to its base 24. A further pneumatically powered drive means 124 moves the jaw between its open and closed positions.

Still referring to FIGS. 1 and 2, eachh drive means 120–123, upon actuation, drives the manipulator 12 between two predetermined but adjustable limits. A shock absorber 130 registers with an adjustable stop 132 to limit the extended movement of the manipulator while a second shock absorber 134 registers with an adjustable stop 136 to limit the retracted position of the manipulator 12 with respect to its base 24. Similarly, shock absorbers 138 and 140 (FIG. 4) register with adjustable stops 142 and 144, respectively, to limit the raised and lowered positions of the shaft 14.

With reference to FIGS. 1 and 4, in order to limit the rotational positions of the shaft 14, a disc 146 is secured to and rotates in unison with the shaft 14. One or more stops 148 are secured to the disc 146 and these stop(s) 148 register with shock absorbers 150 and 152 at the extreme clockwise and counterclockwise positions of the shaft 14. Furthermore, each shock absorber preferably includes a fine adjustment which functions in conjunction with the adjustable stops.

With reference now to FIGS. 1, 4, and 6, a program drum 30 is provided for selectively controlling the actuation of the drive means 120–124. The program drum 30 comprises an upper circular hub 32 and a lower circular hub 34 and the hubs 32 and 34 are rotatably mounted to the housing 10 about a vertical axis in a fashion which will subsequently be described in greater detail. As best shown in FIG. 6, a plurality of circumferentially spaced and axially extending outer rods 36 extend between the upper and lower hubs 32 and 34. Similarly, an inner set of circumferentially spaced and axially extending rods 38 also extend between the upper and lower hubs 32 and 34 so that one inner rod 38 is radially aligned and spaced inwardly from each outer rod 36. Preferably, the rods 36 and 38 are circumferentially equidistantly spaced from each other.

Referring now particularly to FIGS. 4 and 6, the program drum 30 includes a plurality of cam segments 40, each having an outer cam surface 42. Each cam segment 40 includes an axially extending outer bore 44 and an axially extending inner throughbore 46. One outer rod 36 is slidably positioned through each outer bore 44 while one inner rod 38 is slidably positioned through the inner bore 46. Consequently, the cam segments 40 are axially adjustable along the rods 36 and 38 and thus along the drum 30. Conventional means, such as a set screw 50 (FIG. 6), upon tightening, locks each cam segment 40 to the drum 30 at its adjusted position.

Still referring to FIGS. 4 and 6, the cam segments 40 are arranged along the program drum 30 into a plurality of axially spaced segmented cam rings 52. An exemplary segmented cam ring is shown in FIG. 6 and includes one or more cam segments 40 at predefined circumferential positions around the cam ring 52. Furthermore, as best shown in FIG. 6, each cam ring typically includes one or more open spaces 54 formed by the ommission of the cam segment 40 from the particular pair of drum rods 36 and 38.

Figure 5:
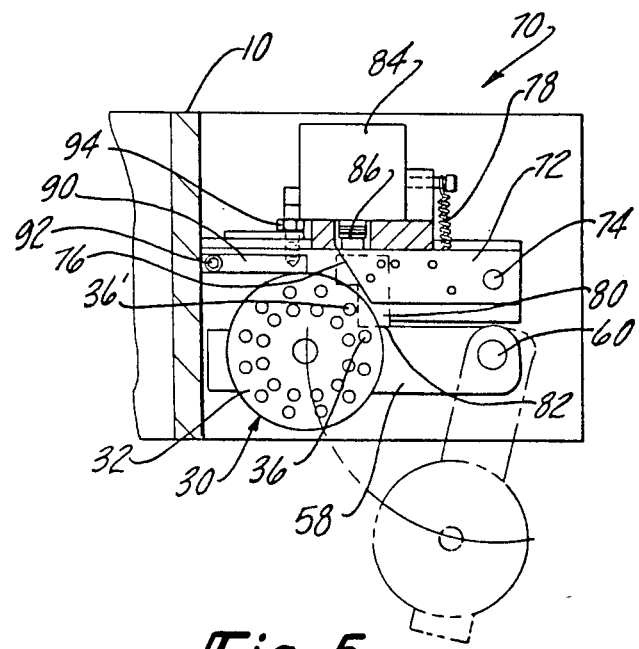
FIG. 5 is a view taken substantially along lone 5—5 in FIG. 4.

With reference now to FIGS. 4–6, the upper drum hub 32 is rotatably mounted to an upper swing arm 56 while the lower drum hub 34 is rotatably mounted to a lower swing arm 58. The arms 56 and 58 are pivotally mounted to a vertically extending bearing rod 60 secured to the housing 10 so that the entire program drum can be swung from its operating position, shown in solid line in FIG. 5, and to its programming position, shown in phantom line in FIG. 5. In its programming position, the program drum is thus positioned outwardly from the housing 10 to provide easy access to the drum 30 for programming the drum 30, i.e., adjusting the position of the cam segments 40 along the drum rods 36 and 38. Locking bolts 62 (FIG. 4) secure the program drum 30 in its operating position once the programming of the drum 30 has been completed.

With reference to FIG. 8, the program drum 30 can alternatively be removed from the arms 56 and 58 and rotatably proceeds in a fixture 200. The fixture 200 includes a side plate 202 having a plurality of axially spaced slots 204 which correspond to the axial spacing of the cam followers 64. The cam segments 40 pass through the slots 204 so that, when the drum freely rotates on the fixture 200, the cam segments 40 are properly axially spaced along the drum 30. Indicia on the fixture side plate 202 facilitates the positioning of the cam segments 40 on the drum to obtain the desired movement for the manipulator.

Figure 3:
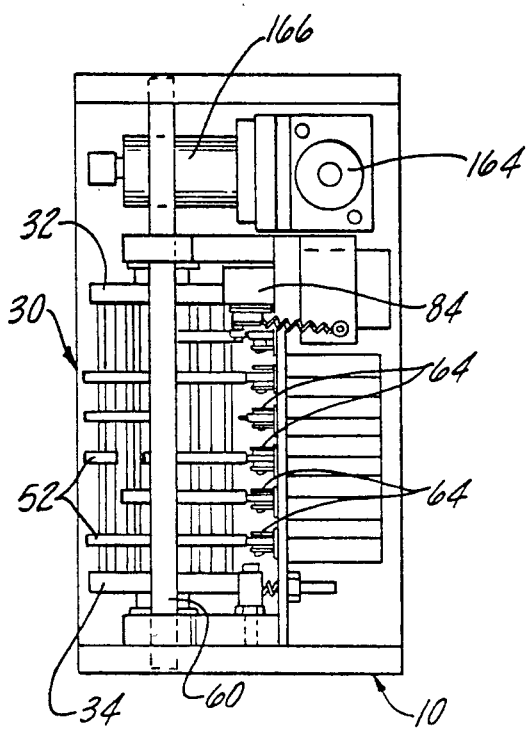
FIG. 3 is an end view of a preferred embodiment of the invention.

With reference now particularly to FIGS. 1 and 3, a plurality of cam followers 64 are secured to the housing 10 so that one cam follower 64 is aligned with each cam ring 52 on the drum 30. Each cam follower 64, in turn, is connected with a spool valve 66 (FIG. 1), so that, when the cam follower 64 engages a cam segment 40, its associated spool valve is actuated. Conversely, when the cam follower 64 does not engage a cam segment but instead registers with an open area 54 between two cam segments 40, the cam follower 64 deactuates its associated spool valve 66.

Each spool valve 66, in turn, is operatively connected with one of the drive means 120–124. Thus, when one spool valve 66 is actuated by its cam follower 64, the spool valve 66 fluidly connects its associated drive means 120–124 with a source (not shown) of pneumatic pressure to move the manipulator 12 along the axis of movement for that particular drive means 120–124. Conversely, upon deactuation of the spool valve 66, the spool valve 66 disconnects its associated drive means 120–124 from the pneumatic pressure source and the movement of the manipulator 12 along that particular axis of movement terminates.

Figure 7:
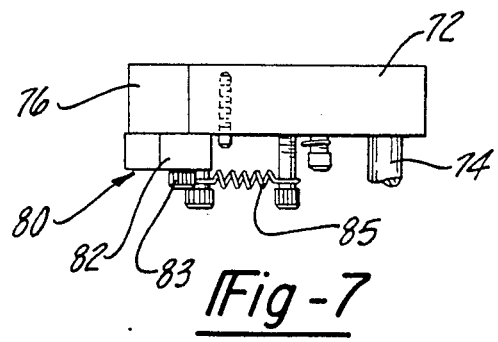
FIG. 7 is a fragmentary view of a preferred form of the ratchet assembly with parts removed and enlarged for clarity.

With reference now particularly to FIGS. 5 and 7, the robot includes a ratchet assembly 70 for incrementally rotatably driving the program drum 30. The ratchet assembly 70 includes an arm 72 which is pivotally mounted by a pin 74 to the housing 10 while its opposite end 76 registers with the top hub 32 of the drum 30. The arm 72 is urged towards a retracted position, shown in solid line in FIG. 5, by a tension spring 78. An L-shaped pawl 80 is pivotally secured to the arm 72 adjacent its free end 76 and has an end 82 which registers with an outer rod 36 on the program drum 30.

A pulse cylinder 84 having a plunger 86 is also secured to the housing 10 so that the plunger 86 abuts against the arm 72 adjacent its end 76. Upon actuation of the cylinder 84, the plunger 86 extends from the cylinder 84 until the end 76 of the arm 72 abuts against the cylinder hub 32. In doing so, the pawl 80 engages the rod 36 and rotatably drives the program drum 30 an incremental amount in the clockwise direction as viewed in FIG. 5. Upon deactuation of the cylinder 84, the spring 78 returns the arm 72 and attached pawl 80 to its retracted position whereupon the end 82 of the pawl 80 abuts against the next circumferentially spaced rod 36' (FIG. 5), and the above-identified process is repeated. Furthermore, when the arm 72 is returned from its extended and to its retracted position, the pawl 80 pivots with respect to the arm 72 about a pin 83 due to interference with the drum rod 36 and is returned to the position shown in FIG. 5 by a spring 85 (FIG. 7).

As shown in FIGS. 3 and 4, four valves 160, 162, 164 and 166 control the actuation of the pulse cylinder 84. The valve 160 is a pulse valve while the valves 162 and 164 are timing valves to control both the duration of actuation of the pulse cylinder 84 and the interval between actuation of the pulse cylinder 84. The final valve 166 is a power valve to provide sufficient pressure to the pulse valve 84 to drive the drum 30.

Still referring to FIG. 5, a brake lever 90 is pivotally secured by a pin 92 to the housing 10 and registers with the lower hub 34 (FIG. 4) of the program drum 30. The brake lever 90 is adjustably urged against the drum disk 34 by a threaded fastener 94 to prevent overtravel of the program drum 30 upon activation of the ratchet assembly 70.

In operation, the program drum 30 is first pivoted to its outer position, as shown in phantom line in FIG. 5, and thus is moved away from the cam followers 64. With the program drum 30 in its outer or programming position, the cam segments 40 are arranged along the program drum rods 36 and 38 to provide the desired sequential actuation of the various drive means 120-124 in order to obtain the overall desired movement of the manipulator 12. Once the cam segments have been adjusted to obtain the desired overall movement of the manipulator 12, the cam segments 40 are secured to the program drum rods 36 by the set screws 50 and the program drum 30 is returned to its operating position as shown in solid line in FIG. 5.

The ratchet assembly 70 is then activated to incrementally rotatably drive the program drum 30 at a predetermined rate as set by the valves 160-166. As the drum 30 is rotatably driven, whenever the cam followers 64 engage a cam segment 40, the cam followers 64, through the valves 66, actuate their associated drive means 120-124. It will be understood, of course, that two or more drive means 120-124 may be simultaneously actuated to provide simultaneous movement of the manipulator 12 along their respective axes of movement. For example, assuming that the drive means 122 and 123 (FIG. 1) are simultaneously actuated, the manipulator 12 rotates about its axis (arrow 22) simultaneously as it extends from its base 24.

Although the cam rings 52 and the cam followers 64 have been described solely for actuating the drive means 120-124, it will also be understood that they may also be employed to provide a timing signal to other equipment.

From the foregoing, it can be seen that the robot of the present invention discloses a simple and yet highly effective means for programming sequential as well as simultaneous movement of a robot arm or manipulator. The program drum 30 is not only easily programmable but the programming can be changed or varied as desired by simple rearrangement of the position of the cam segments 40 along the rods 36 and 38 of the program drum 30.

Although in the preferred form of the invention, the cam followers 64 selectively operate spool valves 66 to actuate pneumatically powered drive means 120-124, other types of drive means may alternatively be used. For example, electrical switches may be substituted for the spool valves 66 and used to control electrically powered drive means.

Having described my invention, however, many modifications thereto will become apparent to those skilled in the art to which it pertains without deviation from the spirit of the invention as defined by the scope of the appended claims.

I claim:

1. In a robot of the type having a housing, a manipulator movable along predefined axes of movement, a drive means associated with each axis of movement for moving, upon actuation, said manipulator along said axis of movement, means for selectively controlling the actuation of each of said drive means comprising:

a drum,
   means for rotatably mounting said drum to said housing,
   a plurality of cam segments, said cam segments extending circumferentially around said drum,
   means for adjustably securing said cam segments to said drum at user selected axially spaced positions along said drum,
   a plurality of cam followers secured to said housing at axially spaced positions and adjacent said drum so that said cam followers register with said cam segments,
   means associated with each cam follower for actuating a predetermined drive means when said cam follower engages a cam segment,
   means for rotatably driving said drum; and
   wherein said drum comprises an upper hub and a lower hub, said hubs being spaced apart from each other, a plurality of rods extending between said hubs at circumferentially spaced positions around the axis of said drum, and wherein said cam segment securing means comprises means for securing said cam segments to said rods.

2. The invention as defined in claim 1 wherein cam segment securing means comprises means for axially adjustably securing said cam segments to said rods.

3. The invention as defined in claim 2 wherein said rods comprise a first set of rods extending between said hubs at circumferentially spaced positions around the axis of said drum and a second set of rods so that one rod in the second set is spaced radially inwardly from each rod of the first set, and wherein each cam segment includes two throughbores, one rod in the first set being slidably positioned through one throughbore and one rod in the second set being slidably positioned through the other throughbore.

4. The invention as defined in claim 1 and comprising means for pivotally mounting said drum to said housing between a first position in which said drum is adjacent said cam followers, and a second position in which said drum is spaced from said cam followers.

5. The invention as defined in claim 1 wherein said drum rotatable driving means comprises means for incrementally rotatably driving said drum.

6. The invention as defined in claim 5 wherein said rotatable driving means comprises a ratchet and pawl assembly.

7. The invention as defined in claim 1 and comprising means for braking one of said hubs.

8. The invention as defined in claim 1 wherein each drive means comprises a fluid powered drive means and wherein said actuating means comprises a valve fluidly connected with said drive means.

9. The invention as defined in claim 1 and comprising means for adjusting the speed of said rotatable driving means.

10. In a robot of the type having a housing, a manipulator movable along predefined axes of movement, a drive means associated with each axis of movement for moving, upon actuation, said manipulator along said axis of movement, means for selectively controlling the actuation of each of said drive means comprising:

a drum, means for rotatably mounting said drum to said housing, a plurality of cam segments, means for securing said cam segments to said drum at axially and circumferentially spaced positions, a plurality of cam followers secured to said housing at axially spaced positions and adjacent said drum so that said cam followers register with said cam segments, means associated with each cam follower for actuating a predetermined drive means when said cam follower engages a cam segment, and means for rotatably driving said drum wherein said drum rotatable driving means comprises means for incrementally rotatably driving said drum, wherein said rotatable driving means comprises a ratchet and pawl assembly, and wherein said ratchet and pawl assembly comprises a pawl movable between a retracted and an extended position, means for moving said pawl from said retracted and to said extended position, and an arm secured to said pawl and which abuts against said drum when said pawl is in said extended position.

* * * * *